United States Patent [19]

Loeffler

[11] 4,178,123
[45] Dec. 11, 1979

[54] TRAILER BOX LOADER SYSTEM

[76] Inventor: Robert B. Loeffler, 1026 Adams St., Los Banos, Calif. 93635

[21] Appl. No.: 859,293

[22] Filed: Dec. 12, 1977

[51] Int. Cl.² .......................................... B65G 67/04
[52] U.S. Cl. .................................... 414/523; 414/339
[58] Field of Search .............. 214/41, 44, 83.26, 520, 214/17 C; 198/312, 313, 316; 414/339, 467, 502, 503, 523, 528

[56] References Cited

U.S. PATENT DOCUMENTS

| | | | |
|---|---|---|---|
| 1,263,170 | 4/1918 | Webb | 214/44 A X |
| 1,272,655 | 7/1918 | Gawlet | 214/44 A |
| 1,361,832 | 12/1920 | Crilly | 214/44 A X |
| 1,474,585 | 11/1923 | Fritschi | 214/41 R |
| 1,578,023 | 3/1926 | Greenleaf | 214/41 R |
| 2,597,974 | 5/1952 | Clarke | 214/83.26 |
| 2,711,262 | 6/1955 | Bing | 214/520 |
| 3,110,390 | 11/1963 | Marvin | 214/83.26 X |
| 3,204,788 | 9/1965 | Kleinsorge | 214/83.26 |

FOREIGN PATENT DOCUMENTS 677644 1/1964 Canada .................................. 214/44 A
1127179 12/1956 France ................................. 214/83.26

Primary Examiner—Trygve M. Blix
Assistant Examiner—Terrance L. Siemens
Attorney, Agent, or Firm—Thomas Schneck, Jr.

[57] ABSTRACT

A loader system for agricultural trailer boxes wherein a self-propelled carriage is provided with wheels to be driven on beams placed atop trailer boxes. The carriage supports conveyors extending over lateral sides of the trailer and the conveyors feed a chute emptying into the trailer interior. The beams of each trailer box can be linearly connected so that the carriage may be driven for one trailer to a queued trailer over a bridge formed by joining beams.

9 Claims, 7 Drawing Figures

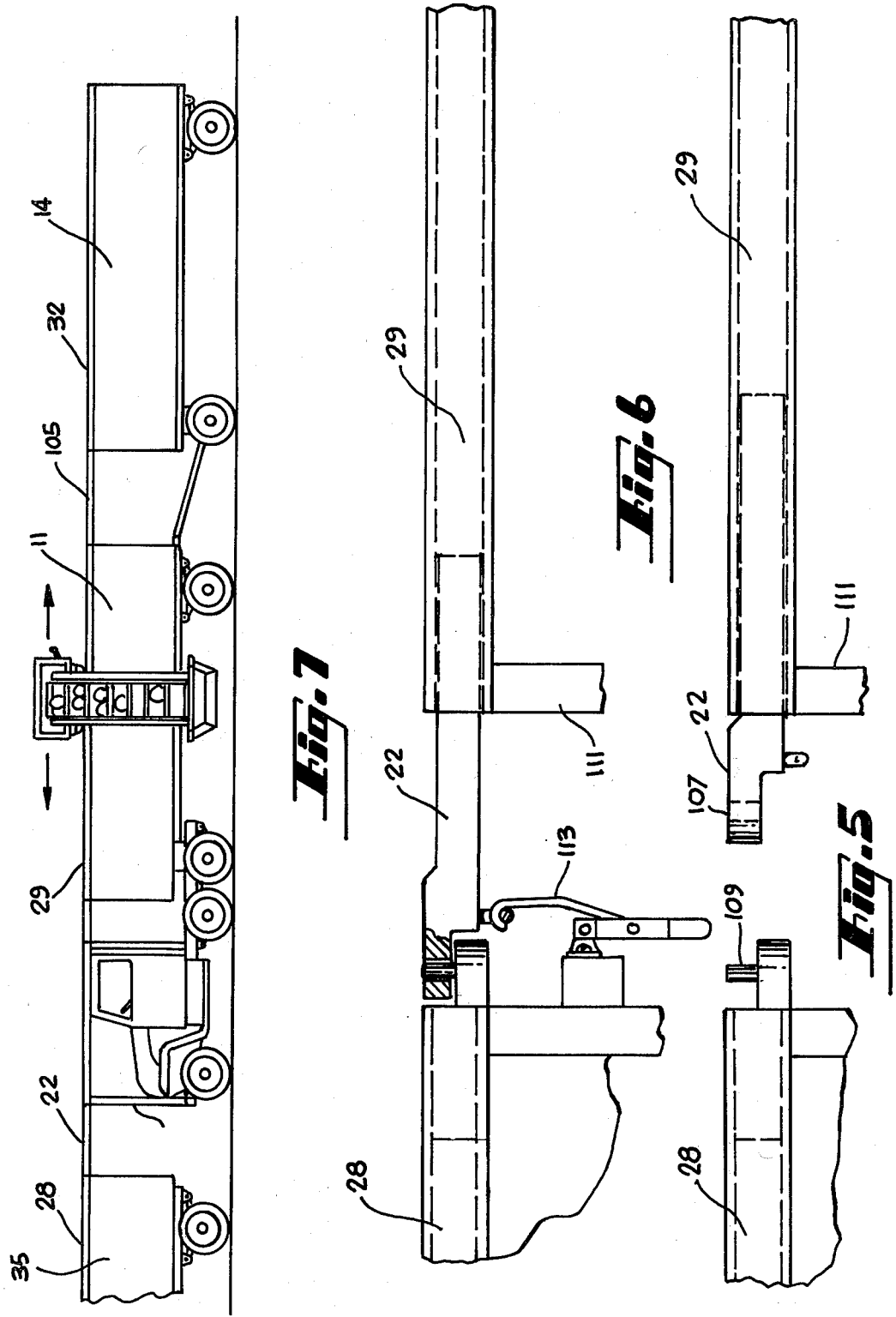

4,178,123

TRAILER BOX LOADER SYSTEM

BACKGROUND OF THE INVENTION a. Field of the Invention:

The invention relates to land vehicles, and more particularly to a carriage movable atop trailer boxes for loading them, particularly with agricultural products.

b. Prior Art:

Previously, agricultural trailer boxes have been loaded by placing inclined walkways from a harvest area up into the rear edge of the trailer. Recognizing the severe demands on the strength of field workers to walk up an inclined walkway with a heavy load, others have devised motor powered conveyors which load trailers from ground level. When such conveyors fill one portion of the trailer box they are manually transported to another portion of the trailer until the trailer is loaded.

While the conveyors of the prior art alleviate part of the problem, they are usually manually moved from the ground from one part of the trailer to the next by someone who cannot see where the optimum location for the conveyor should be. To select an optimum location, another person must climb atop the trailer to direct the positioning of the conveyor. If the trailer is being pulled, this operation can only be safely carried out when the trailer comes to a stop. It is preferable to harvest large areas as fast as possible and to do this, trailer boxes are slowly driven through the harvest areas, approaching workers who deposit field products into the trailer boxes at momentary stops.

Another problem which arises is in transferring the conveyors from one trailer to another. If the conveyors have motors at the top, the transfer operation can easily demand the attention of two people. It is an object of the present invention to provide a trailer box loader system wherein conveyors for loading a trailer box can be moved to optimum loading positions by a single person while the trailer box is stopped or in motion, and which may be readily transferred from one trailer box to another.

SUMMARY OF THE INVENTION

The above object has been achieved in a loader system for agricultural trailer boxes which features a self-propelled carriage moveable on beams atop side panels of the trailer box. The carriage mounts and powers a pair of conveyors which extend over the exterior side panels of the trailer box and which may be loaded from ground level. The carriage has a lattice framework which extends across the width of a trailer box, with sides which support the conveyors. Articles lifted by the conveyor pass through side portions of the carriage and then into the interior of the trailer box.

The carriage is controlled by an operator who operates it from a position wherein he can see the position of the conveyors relative to the trailer box load and can also see the alignment of the carriage wheels. A hydraulic propulsion and control system is used so that a single prime mover can power both conveyors as well as independently drive left and right carriage wheels. By driving both sides separately, misalignments in the carriage wheels which occur as the trailer traverses bumpy roads can be straightened.

The beams atop each side panel are hollow and have extensible end members for connection to corresponding beams in another similar trailer box positioned in line with the first trailer box. Connected beam members of queued trailer boxes form a bridge between such queued trailers so that the carriage can be driven over one loaded trailer box to a waiting unloaded box. A bridge may be formed with trailer boxes in front of and/or behind the trailer box carrying the carriage. In this manner, a carriage may be readily transferred from one trailer to an adjacent one.

BRIEF DESCRIPTION OF THE DRAWINGS

FIG. 5 is a side detail showing beam connection apparatus for use between side panels of queued trailer boxes of the type illustrated in FIG. 1.

FIG. 6 is a side detail showing the beam connection apparatus of FIG. 5 forming a bridge between queued adjacent trailer boxes.

FIG. 7 is a side plan view of trailer boxes queued front and rear of a trailer box supporting a carriage.

DESCRIPTION OF THE PREFERRED EMBODIMENT

Figure 1:
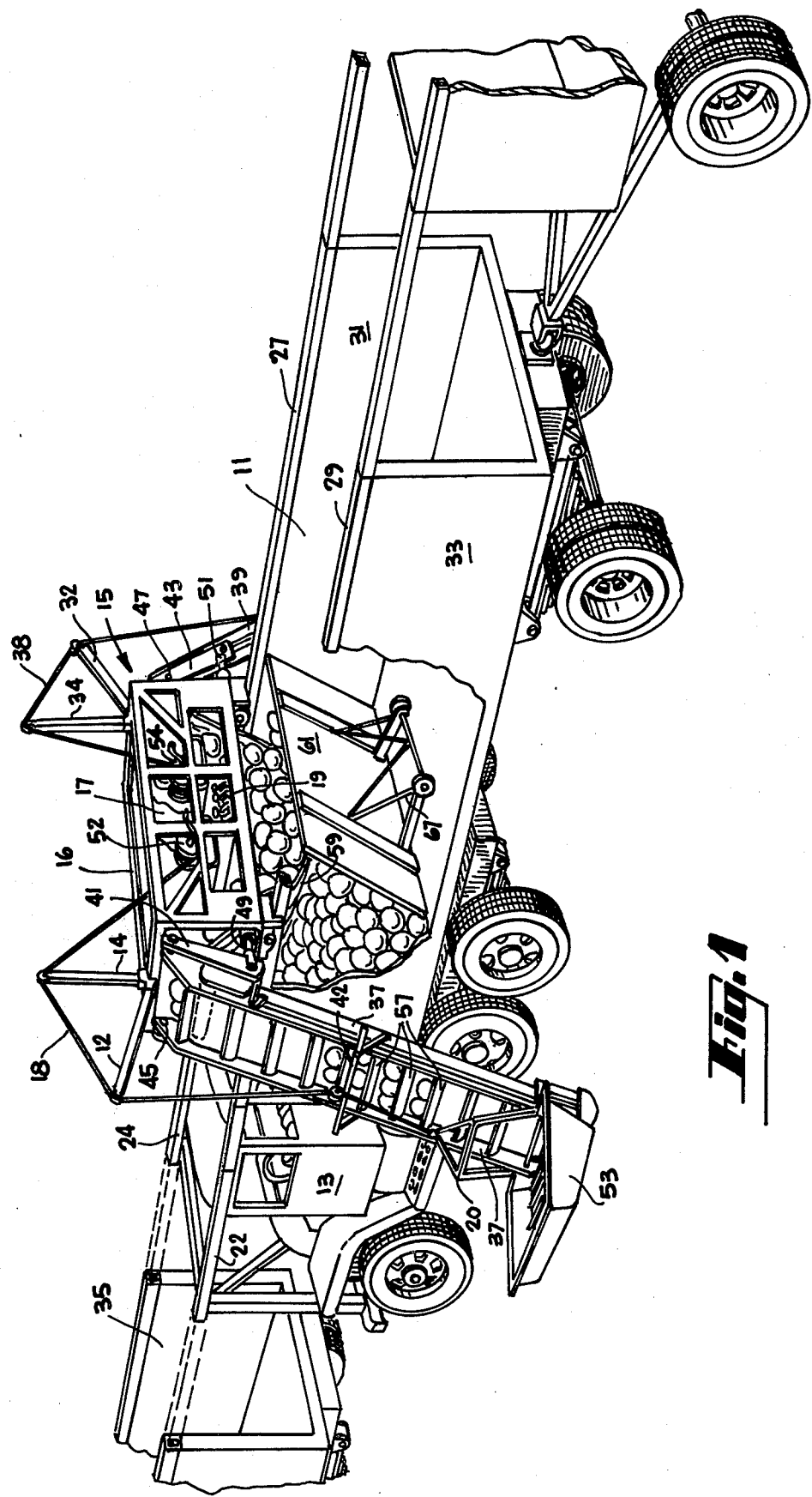
FIG. 1 is a perspective partial cutaway view of the loader system of the present invention.

The loader system for agricultural trailer boxes of the present invention is intended to be used for loading trailers of the type customarily used for harvesting melons, tomatoes and the like. In FIG. 1, such a trailer box 11 is shown to be pulled by the detachable tractor 13. A carriage 15 is a self-propelled vehicle which has an engine 17, typically a 12 horse-power gas engine mounted within a boxlike framework 16. Engine controls are mounted on a control panel 19 which faces an operator who stands or may be seated near the controls.

Carriage 15 rides on wheels, with at least one pair of wheels on each side of the carriage. Each pair of wheels is independently driven by a hydraulic motor powered by engine 17. The wheels ride atop of beams 27, 29 which are mounted at the top of the side panels 31, 33, respectively of the trailer box 11. Each of the beams contains beam connecting members, 22, 24 as explained hereinafter, to bridge the span to a queued trailer box 35. By providing a bridge across the span between trailer boxes, the carriage 11 may be driven from trailer box 11 to the next trailer box 35 without the need for picking up the carriage.

Carriage 15 mounts a pair of laterally opposed conveyors 37, 39 for loading the trailer box 11 from the ground. The conveyors are demountably attached to conveyor support housings 41, 43. Each of the conveyor support housings is triangular with the apex of the triangle consisting of two upright beam members pivoted at the pivot arms 45, 47. One of the upright arms is an edge beam of the framework of carriage 15 while the other arm extends outwardly from the carriage away from the trailer box at an angle determined by shock absorbers 49, 51. Each of the conveyors 37, 39 is merely hung on the underlying conveyor support housing 41, 43 and may be readily detached whenever obstructions are encountered.

Conveyor 37, being pivoted at pivot arm 45 may have its angle, with respect to side panel 33, adjusted by means of cable 18 which is connected to yoke 42 by means of a boom 12 and boom support 14. The far end of cable 18 is connected to winch 52 near control panel 19. Cable 18 is also used to control the angle of the bin 53 which is rotatably mounted with respect to conveyor 37. The angle of bin 53 is adjusted by motion of yoke 20. Yoke 20 and yoke 42 both move under the influence of cable 18. For example, a lowering of cable 18 allows the bottom of the conveyor to approach the ground, while at the same time bin 53 is lowered. A similar boom 32 and boom support 34 are provided on the other side of carriage 15 for controlling the angle of conveyor 39.

Hydraulic motors are driven by engine 17 which power each of the upward conveyors 37, 39. The conveyors each have a bin, such as bin 53 on conveyor 37 and a plurality of paddles 57 for transferring melons or similar articles upwardly. Each bin has a smaller horizontal paddle conveyor therein for assisting the loading of the upward conveyor.

The lower portion of carriage 15 mounts a saddle shaped chute 59, preferably made of canvas, which has an upper portion which communicates with the top of both of the conveyors 37, 39 and a lower chute portion which funnels melons emptied into the chute toward the center of the interior of the trailer box 11, i.e. between the side walls 31, 33.

A load closure 61 is provided to close the rear of trailer box 11 as is presently done. Load closure 61 has a wheel assembly 67 mounted at the bottom thereof. Wheel assembly 67 assists load closure 61 in moving toward the back of trailer box 11 as the trailer is filled. The function of load closure 61 is to help fill forward portions of the trailer box up with melons prior to filling rearward portions. As forward portions are filled, the carriage is driven rearwardly and intermediate portions of the trailer box are filled successively from front to back until the entire box is filled. The load closure 61 assists in filling a trailer box by redirecting melons coming out of chute 59. The lower portion of chute 59 directs melons rearwardly toward load closure 61, but since the load closure 61 has a forward slope, melons reverse their direction and are given gravitational forward momentum for filling forward portions of the trailer box.

Figure 2:
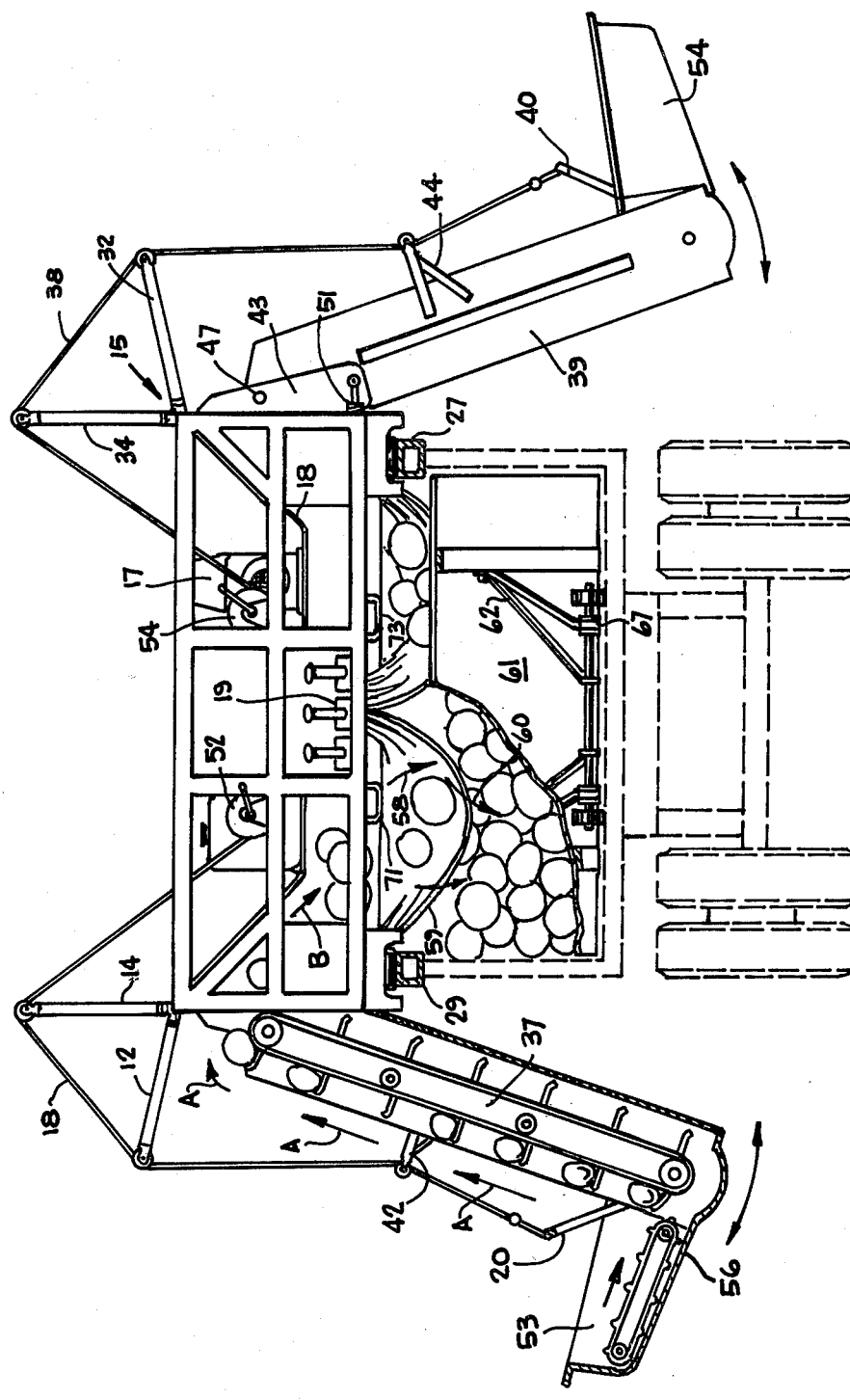
FIG. 2 is a partial cutaway, rear elevation of the apparatus of FIG. 1.

With reference to FIG. 2, a rear view of the loader system of the present invention may be seen. In particular, engine 17 is seen to be supported on a platform 18 in the upper portion of trailer box 11 so that produce entering the upper portion of chute 59, indicated by arrow 58, can pass directly below the engine toward the lower portion of the chute indicated by the arrow 60. As mentioned previously, the melons will be deflected toward the forward part of the loader box by the load closure 61.

Conveyor support housing 43 may be seen to include the pivot arm 47 for allowing the support housing to pivot in accord with variations in length of the shock absorber 51 which is mounted in the lower portion of the support housing.

It will be seen that boom 12 and cable 18 extending over the boom and boom support 14 control the angle of conveyor 37 by means of tension on yokes 42 and 20. Similarly, boom 32 and boom support 34 adjust the angle of conveyor 39 by means of tension on yokes 40 and 44. The angle of each conveyor can be adjusted by the winches 52, 54, each of which is mounted near control panel 19. Of course, a boom is not the only means of adjusting the angle of the conveyor with respect to the side panels of the trailer box. A hydraulic ram or similar apparatus could also be used. The conveyor support housing, together with the conveyor and the conveyor angle adjusting apparatus forms a conveyor means for the trailer box described herein. All of these components are not necessary to form a conveyor means, but are preferable to provide the advantages described herein. The boom or hydraulic ram form a means for adjusting the angle of the conveyor with respect to the side panels and while such a means is desirable, it is not a necessary part of the invention herein.

FIG. 2 also shows beams 27, 29 and the alignment of carriage 15 over the beams. Because the left and right wheels are independently driven, an operator can provide power to one side of the carriage and not the other, and vice-versa. Such operation is desirable whenever the trailer box is moving down a bumpy road and carriage 15 becomes misaligned or crooked. By independently powering the left and right wheels, the carriage may be moved diagonally with respect to the trailer box for short distances, amounting to a few inches. This is sufficient to correct the alignment of the carriage 15 to a desired alignment.

The carriage will be seen to have a pair of slots 71, 73, formed of metal of dimensions for accommodating the tangs of a forklift so that the carriage 15 may be raised from a trailer box for maintenance and/or servicing. In this instance, the conveyors 37, 39 are lifted off from the conveyor support housings 41, 43.

The position of control panel 19 gives an operator a view of the wheels 23, 25, as well as a view of the conveyors, booms, yokes, and the status of the trailer box region immediately proximate to the chute and the extent of space remaining behind the load closure 61 for controlling movement of the carriage.

FIG. 2 illustrates how melons are placed in bin 53 and moved upwardly in the conveyor as indicated by the arrows A to the top of conveyor 37 whereupon the melons are deflected downwardly, partially by their own weight into the lower portion of the frame of carriage 12 which communicates with the top of conveyor 37. The melons fall downwardly in the direction indicated by the arrow B into a removable chute 59 which has a downward gradient, similar to a funnel. The melons gain some downward momentum and once they leave the bottom of chute 59 they are deflected against load closure 61 and then roll down the load closure into the trailer box. It is important that the downward gradient be limited to one in which the produce will not be bruised. For that purpose, the angle of closure 61 relative to vertical may be adjusted, for example, by bracing assembly 62. FIG. 2 shows horizontal conveyor 56 in bin 53 feeding upright conveyor 37. Conveyor 56 is driven by a hydraulic motor near the lower portion of conveyor 37. Bin 53 is hinged with respect to conveyor 37 so that its angle with respect to ground may be adjusted.

Figure 3:
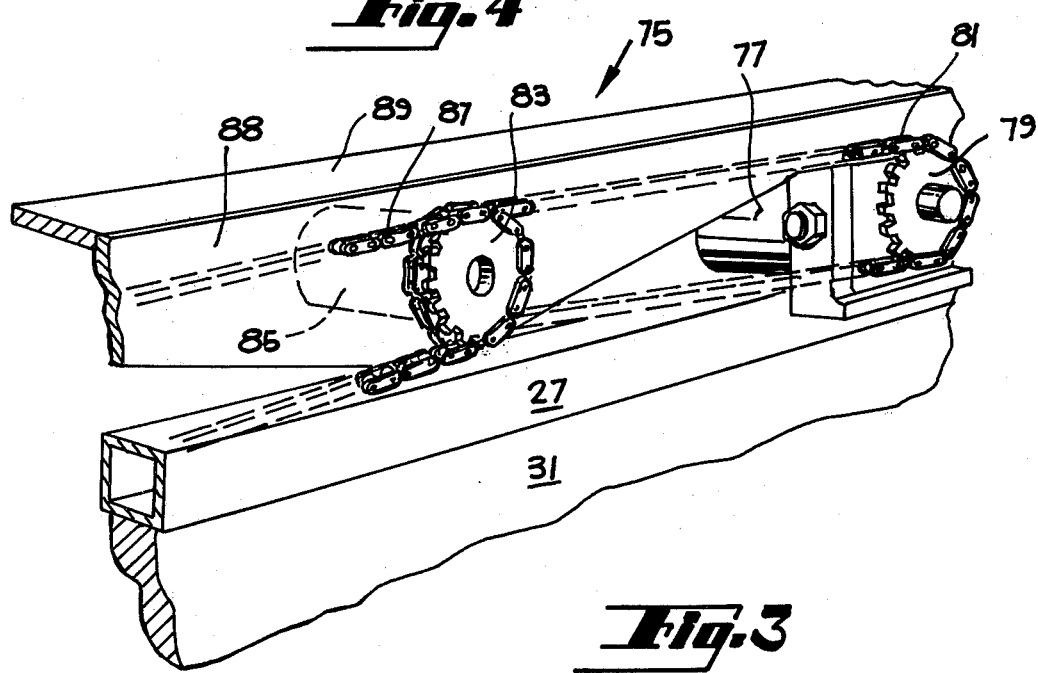
FIG. 3 is a perspective detail showing wheel mounting for a carriage illustrated in FIG. 1.

FIG. 3 illustrates a wheel housing 75 one of which is disposed on each side of the carriage for riding over a beam atop each side panel of the carriage. In FIG. 3, beam 27 is atop panel 31. The right wheel housing 75 includes a first wheel 77 which is driven by gear 79 by means of chain 81. A sprocket 83 drives chain 81 from power developed by hydraulic motor 85 which in turn is powered by engine 17 in FIG. 1. Sprocket 83 also drives second chain 87 which drives a gear connected to a second wheel, not shown, in line with the first wheel 77. A lid 89 forms a portion of the wheel housing 75, providing a protective cover over the hydraulic motor, chains and gears. A side cover 88 provides safety from unwanted contact with the gear and chains.

Figure 4:
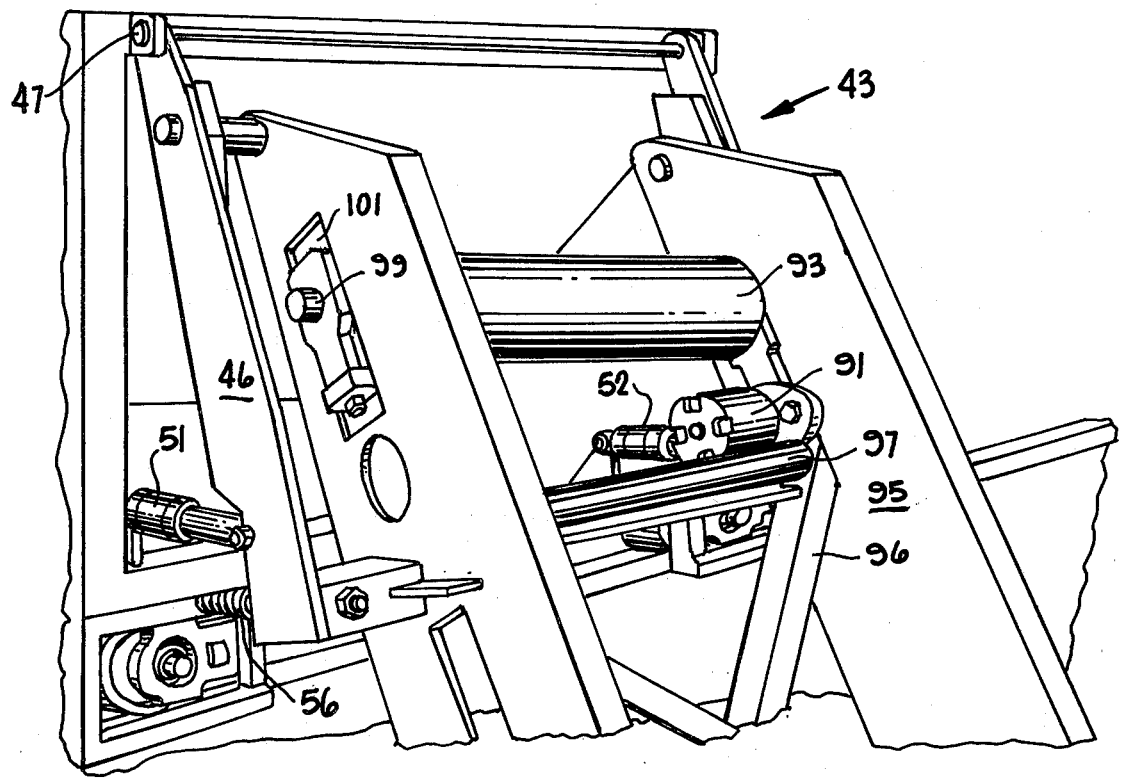
FIG. 4 is a perspective detail showing conveyor mounting and locomotion apparatus for a conveyor illustrated in FIG. 1.

FIG. 4 illustrates a detail of the construction of the conveyor support housing 43. The upright arm 46 forms a portion of a conveyor support housing 43 which is permanently attached to carriage 15 by means of a pivot arm and shock absorbers 51, 52. A hydraulic motor 91 powers a drive roller 93 by means of a belt in shroud 95. Drive roller 93 provides motion to a conveyor belt not shown and the conveyor belt maintains its rolling quality over a series of three to six rollers, such as roller 97 disposed across the conveyor belt path, slightly above the lattice framework 96 which supports the conveyor belt. These rollers are spaced at equal distances along the belt path. The drive roller has bearings, such as bearing 99 on each side which may be adjusted within a slot 101 to set the tension in the conveyor belt. A spring 56 keeps the conveyor from being pulled outwardly, away from the carriage beyond a desired limit.

FIG. 5 illustrates the construction of the forward portion of the beam 29, above a side panel 33 of the trailer box. Beam 29 is hollow and has a beam connecting member 22 telescoped therein so that beam connecting member 22 can be retracted when not in use. Beam connecting member 22 has a tongue 107 having dimensions such that it will fit removably on a beam receiver 109 in adjacent beam 28. When other trailer boxes have similar dimensions, beam connecting member 22 has a length for spanning the gap to an adjacent, aligned beam of another trailer box, such as beam 28. Tongue 107 and reciever 109 have dimensions such that alignment of beams of queued trailer boxes is not critical. Connecting member 22 need not be telescoping, so long as it is extensible. A hinged connecting member would also work.

FIG. 6 illustrates the manner in which a beam connecting member 22 can span the space between beams 29 and 28. Usually, a beam connecting member 22 with a length of approximately nine feet has been found to be ample for spanning the distance from one beam to an adjacent beam. A latching mechanism 113 may be used to secure connecting member 22 to beam 28. A shorter beam for spanning the space between queued connected trailers is used, as between trailer boxes 11, 35 in FIG. 7.

FIG. 7 illustrates queued trailer boxes 35, 11 and 14 with the beam connecting member 22 spanning the space between beams 28 and 29 and the beam connecting member 105 spanning the space between beams 29 and 32. The most forward portion of beam 29 is supported by a support member 111 connected from the front bumper of the truck or any other suitable rigid support, such as a sturdy hood and fender combination. Since the carriage typically weighs 1600 pounds with conveyors detached, the support member 111 must be sturdy enough to carry this weight. Once the beam connecting members 22, 105 are extended and span the space between aligned beams, the carriage 15 may be transferred between queued trailer boxes.

In this patent application, specific reference has been made to the loading of agricultural products, especially melons. It will be realized that other items could similarly be loaded.

What is claimed is:

1. A loader system for agricultural trailer boxes or the like comprising, a trailer box having opposed panels along the length thereof, said panels having beams atop for supporting loads thereon, a carriage having a frame extending across the width of a trailer box and with opposed wheels connected thereto, positioned for carriage travel on said beams, and at least one conveyor means having top and bottom portions for lifting agricultural goods over one of the beams atop said panels and transferring said goods into said trailer box, said top portion of said conveyor means upwardly supported from said carriage and extending transverse to the length of the panels of the trailer box and angularly downward from the carriage with the conveyor bottom portion clearing ground level, and an angularly adjustable bin connected in ground clearance relationship to the bottom portion of said conveyor means, said bin adapted to feed said agricultural goods to said conveyor means.

2. The apparatus of claim 1 wherein said carriage has motor means attached thereto for moving said carriage.

3. The apparatus of claim 1 wherein first and second conveyor means are each disposed proximate an opposed trailer box panel on the exterior of said trailer box.

4. The apparatus of claim 1 wherein said beams are affixed to the top of said side panels and are extensible in length beyond the length of said panels for spanning the space between queued trailer boxes.

5. The apparatus of claim 1 wherein said opposed wheels and said conveyor means are powered by hydraulic motors energized by an engine mounted in said carriage.

6. The apparatus of claim 1 wherein said opposed wheels are independently driven by separately controlled hydraulic motors energized by an engine mounted in said carriage.

7. The apparatus of claim 1 wherein said conveyor means includes, conveyor support housings mounted on opposed sides of said carriage on exterior sides of said panels, said conveyor support housings demountable from said carriage.

8. The apparatus of claim 4 wherein said beams are telescopically extensible.

9. The apparatus of claim 4 wherein said beams are extended by beam extension members hinged to said beams, each beam extension member having a tongue for connection to a beam of a queued trailer box.

* * * * *